Dec. 10, 1957  G. BULIGA  2,815,618
BACKING PAD
Filed May 3, 1956

G. BULIGA
INVENTOR.

BY E.C. McRae
J. R. Faulkner
D. H. Oster

ATTORNEYS

# United States Patent Office 2,815,618
Patented Dec. 10, 1957

2,815,618
BACKING PAD

George Buliga, Lakeview, Ontario, Canada, assignor to Ford Motor Company, Dearborn, Mich., a corporation of Delaware Application May 3, 1956, Serial No. 582,605

1 Claim. (Cl. 51—197)

This invention is concerned with the art of metal finishing and is more particularly related to an apparatus for efficiently and economically grinding out metal imperfections which occur in the sheet metal work of motor vehicles or other products. These imperfections must, of course, be removed prior to painting. Grinding with hand controlled portable power tools is currently the most economical way of removing these metal defects.

Figure 1:
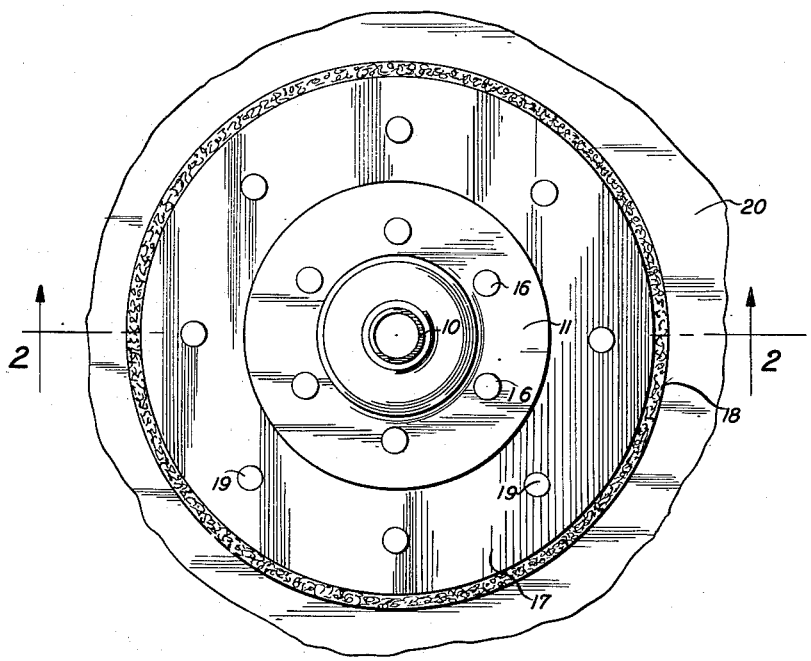
Figure 2:
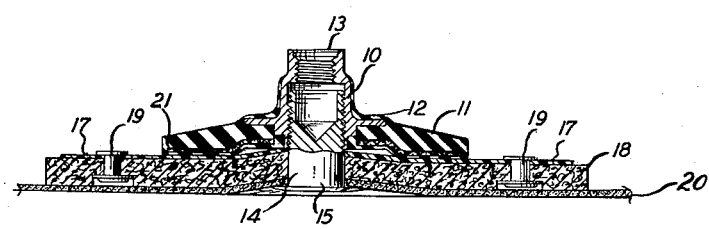

The invention in the instant case resides in an abrasive disc backing pad which is adapted to be secured to and propelled by conventional hand held power tools such as electric drills or air turbines. The structure of this invention is most easily understood if considered in conjunction with the figures of drawings in which:

Figure 1 is a plan view of the abrasive disc backing pad as viewed by the operator holding the tool, and Figure 2 is an axial section along the line 2—2 in Figure 1.

Grinding operations of the type discussed above are carried out primarily by means of abrasive grains securely cemented to the surface of a cloth or paper disc. This disc is secured to a backing pad and used until its abrasive qualities are exhausted when it is discarded and a fresh sheet substituted.

As can be more clearly seen in Figure 2, this backing pad comprises a mounting head, a micarta disc which is a Bakelite impregnated fiber disc and a felt pad. The mounting head consists of a hollow steel shank to which is vulcanized rubber plate 11. Plate 11 has reinforcing cord 21 embedded in its lower portion for added strength and greater wear. Shank 10 is provided with flange 12 to improve the adherence of rubber plate 11 to shank 10. Shank 10 is provided with internal threads 13. That portion of internal thread 13 remote from rubber plate 11 is employed to accommodate the shaft of the electrical drill or air turbine employed to power the grinding operations.

The threads 13 adjacent rubber plate 11 mate with a similarly threaded portion of bolt 14 which is made with a flat head 15 which serves to secure the abrasive disc 20 to the backing pad. Abrasive disc 20 is shown cut away in both Figures 1 and 2.

Rivets 16 penetrate rubber plate 11 (Figure 1) and serve to secure rubber plate 11 to micarta disc 17. Micarta disc is cut away to permit the passage of bolt 14. Felt disc 18 is superimposed upon micarta disc 17 and secured thereto by rivets 19. Disc 18 may also be fastened to disc 17 by means of a sleeved nut and screw or other nut and screw arrangements. It will be noted that rivets 19 penetrate micarta disc 17 and felt disc 18 but not rubber plate 11. Rivets 16 and rivets 19 are arranged in a concentric pattern, rivets 16 being preferably six in number and rivets 19, eight in number. Micarta disc 17 is somewhat smaller in diameter than felt disc 18 and rubber plate 11 substantially smaller than micarta disc 17. By way of example, felt disc 18 is one-half inch thick and eight and one-half inches in diameter while micarta disc 17 is three thirty seconds of an inch thick and eight inches in diameter, and rubber plate 11 is four and three quarter inches in diameter. Also, felt disc 18 is preferably made of number one medium hard white or grey felt.

Figure 1 shows clearly the relationships between rivets 19, rivets 16, felt disc 18, micarta disc 17 and rubber plate 11. It will be observed that abrasive disc 20 is substantially larger than felt disc 18 to which it is secured. A diameter of ten inches for abrasive disc 20 would be satisfactory.

This specific structure has been employed for some time in the commercial production of automobiles and has been found to far outlast the conventional backing pads and to produce a superior finish.

In operation, the edge of the supported abrasive disc is applied angularly to the work surface and as pressure is applied against the work piece to be metal finished (ground down) the disc and backing pad assembly bend back accordingly. The combination of the felt disc (backing pad) which is secured to the somewhat smaller diameter micarta disc which in turn is secured to the rubber mounting head provides greater flexibility in the assembled disc backing pad than is found in disc backing pads which are currentlffy available and known.

This greater flexibility permits more of the surface of the abrasive disc (40% to 50% more) to be brought in contact with the work surface and hence a greater portion of the abrasive disc surface is used than can be used with currently known backing pads. Thus more work is secured from each abrasive disc.

With the backing pad of this invention, superior grinding results are obtained by using but two grades (of coarseness) of abrasive discs (No. 36 and No. 80 paper) to grind out imperfections in sheet metal surfaces. This backing pad when used with the said disc paper grades permits satisfactory feathering out of the ground area as well as grinding a good smooth surface in the area of the imperfection.

Heretofore using conventional or known disc backing pads, it has been found desirable to use five grades of abrasive discs—namely No. 24, 36, 50, 80 and 120 paper. In addition it was often found necessary to apply a putty glaze to the work surface to smooth out the imperfections even after such grinding.

The disc backing pad in this invention therefore permits more work to be obtained from each abrasive disc, and the grinding and better finishing of metal surfaces with less equipment (power tools), fewer operators and with less loss of time due to changing abrasive paper grades or power tools. It also speeds up metal finishing through elimination of the use of putty glaze. The number of work rejects was noticeably reduced due to the superior metal finish obtained.

The greater flexibility of this backing pad and disc combination also greatly lengthens the work life of the abrasive disc, as well as the backing pad. The backing pads of this inventtion last many times longer than pads of the prior art due at least in part to the greater flexibility, heat absorbing and wearing qualities of the pad of this invention. Recent tests have shown a 17% saving on abrasive discs which was effected when such discs were used with the backing pad of this invention.

When the felt disc pad wears out it can be easily removed and the remaining part of the grinding head salvaged and refitted with a new felt pad. This has not been possible in the conventional backing pads heretofore used.

It will be understood that the invention is not to be limited to the exact construction shown and described, but that various changes and modifications may be made without departing from the spirit and scope of the invention, as defined in the appended claim.

I claim as my invention:

A backing pad for supporting a circular abrasive disc which is substantially larger than the backing pad comprising a mounting head, an abrasive disc retaining bolt having a threaded shank and a relatively flat head, said mounting head including a metallic center portion and a vulcanized rubber outer portion, said center portion defining an axial bore with one end adapted to engage the shaft of a power tool and the other end internally threaded for receiving the shank of said retaining bolt, said outer portion forming a circular, tapered flange with an upper surface of substantially frusto-conical form, and a lower surface defining a plane and having an annular depression concentric with said bore, a circular disc of relatively tough, semi-resilient, plastic-impregnated fiber having a diameter relatively large compared to the diameter of said outer portion and defining an aperture at the center thereof for receiving the shank of said retaining bolt, a plurality of rivets circumferentially positioned through the flange of said outer portion and concentrically securing said circular disc to the lower surface of said flange, a relatively thick circular felt pad with an upper and a lower surface having a diameter greater than the diameter of said disc and defining an aperture at the center thereof for receiving the shank of said retaining bolt, a plurality of rivets circumferentially positioned through said disc and concentrically securing the upper surface of said pad to said disc on the side of the disc remote from said mounting pad, said lower surface defining counter sunk recesses for receiving said rivets, said pad and said disc adapted to be sufficiently deformed by the retaining bolt into the annular depression defined in said outer portion to permit the head of said bolt to lie inward of a plane defined by the lower surface of said felt pad.

References Cited in the file of this patent

UNITED STATES PATENTS

| Re. 20,946 | Carlton | Dec. 13, 1938 |
| 391,581 | Carver | Oct. 23, 1888 |
| 1,648,663 | Stratford | Nov. 8, 1927 |
| 1,724,742 | Albertson et al. | Aug. 13, 1929 |
| 2,132,917 | Albertson | Oct. 11, 1938 |
| 2,409,163 | Stever | Oct. 8, 1946 |
| 2,410,812 | DeMichel | Nov. 12, 1946 |
| 2,480,886 | Stever | Sept. 6, 1949 |
| 2,567,782 | Rhees | Sept. 11, 1951 |
| 2,581,567 | Wiley | Jan. 8, 1952 |